(12) United States Patent
Janani et al.

(10) Patent No.: US 9,692,628 B2
(45) Date of Patent: *Jun. 27, 2017

(54) METHODS AND SYSTEMS FOR DUAL-USING A RECEPTION CHANNEL

(71) Applicant: Redline Innovations Group, Inc., Markham (CA)

(72) Inventors: Mohammad Janani, San Jose, CA (US); Jahan Ghofraniha, San Jose, CA (US); Med A. Nation, Sunnyvale, CA (US)

(73) Assignee: Redline Communications Inc., Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,937

(22) Filed: Nov. 2, 2015

(65) Prior Publication Data

US 2016/0094376 A1    Mar. 31, 2016

Related U.S. Application Data

(63) Continuation of application No. 14/170,622, filed on Feb. 2, 2014, now Pat. No. 9,209,848.

(51) Int. Cl.
| | | |
|---|---|---|
| *H04B 1/10* | (2006.01) | |
| *H04L 27/26* | (2006.01) | |
| *H04B 1/12* | (2006.01) | |
| *H04B 7/0413* | (2017.01) | |

(Continued)

(52) U.S. Cl.
CPC ....... *H04L 27/2623* (2013.01); *H04B 1/1018* (2013.01); *H04B 1/123* (2013.01); *H04B 1/126* (2013.01); *H04B 1/525* (2013.01); *H04B 7/0413* (2013.01); *H04B 7/0817* (2013.01); *H04B 7/0842* (2013.01)

(58) Field of Classification Search
CPC .... H04B 1/126; H04B 7/0413; H04B 7/0639; H04B 7/0417; H04L 25/03343; H04L 27/368; H03F 1/3247; H03F 3/195

See application file for complete search history.

(56) References Cited

U.S. PATENT DOCUMENTS

| | | | |
|---|---|---|---|
| 6,424,681 | B1 | 7/2002 | Tellado |
| 6,512,797 | B1 | 1/2003 | Tellado |
| 7,376,197 | B2 | 5/2008 | Berangi |

(Continued)

*Primary Examiner* — Shuwang Liu
*Assistant Examiner* — Sung Ahn
(74) *Attorney, Agent, or Firm* — Rosenberg, Klein & Lee

(57) ABSTRACT

Various embodiments of wireless communication systems and methods in which the system seamlessly dual-uses a receiver chain for incoming transmissions and for other signal sensing purposes. The system is configured such that there are multiple receiver chains, and at least one receiver chain alternates between receiving a communication signal with information payload and receiving other signals solely for the purposes of monitoring and/or improving some aspects of the system. In various embodiments, the alternating receiver chain receives alternatively signals with information payloads and signals which have passes through a power amplifier with amplifier distortion characteristics. In various embodiments, the alternating receiver chain receives alternatively signals with information payloads and signals which may be associated with background noise, or other radio transmissions.

4 Claims, 14 Drawing Sheets

(51) Int. Cl.
 *H04B 1/525*   (2015.01)
 *H04B 7/08*    (2006.01)

(56) References Cited

U.S. PATENT DOCUMENTS

| | | | |
|---|---|---|---|
| 7,529,524 B1* | 5/2009 | Giallorenzi | H03F 1/3247 |
| | | | 375/295 |
| 7,796,956 B2 | 9/2010 | Khayrallah | |
| 8,964,608 B2 | 2/2015 | Oberhammer | |
| 2004/0014436 A1 | 1/2004 | Lipka | |
| 2005/0163248 A1 | 7/2005 | Berangi | |
| 2005/0169411 A1 | 8/2005 | Kroeger | |
| 2008/0130767 A1* | 6/2008 | Lozhkin | H04L 27/2623 |
| | | | 375/260 |
| 2008/0245047 A1 | 10/2008 | Jobin | |
| 2009/0092195 A1 | 4/2009 | Guo | |
| 2010/0087227 A1 | 4/2010 | Francos | |
| 2010/0093282 A1 | 4/2010 | Martikkala | |
| 2012/0082262 A1* | 4/2012 | Janani | H04L 27/2624 |
| | | | 375/296 |
| 2012/0281777 A1 | 11/2012 | Ho | |
| 2013/0094550 A1* | 4/2013 | Coan | H03F 1/3247 |
| | | | 375/222 |

* cited by examiner

METHODS AND SYSTEMS FOR DUAL-USING A RECEPTION CHANNEL

CROSS REFERENCE TO RELATED APPLICATIONS

This application is a continuation of and claims priority to U.S. application Ser. No. 14/170,622, filed Feb. 2, 2014, now allowed, which is hereby incorporated by reference herein in its entirety.

BACKGROUND

In many wireless communication systems, multiple reception channels are utilized for receiving transmissions, while other channels may be devoted to sampling various signals in order to detect issues with quality, make changes, and thereby improve some aspects related to system operation. Although such systems improve functionality by devoting a channel to sampling various signals, such systems also lose potential reception capacity or sensitivity by the devotion of a channel to signal sampling rather than to communication of information payloads.

SUMMARY

Described herein are electronic communication systems and methods in which one channel is utilized to sampling of various signals in the system, whereas this same channel is also utilized to communication of information payloads.

One embodiment is a wireless communication system operative to seamlessly dual-use a receiver chain for receiving incoming transmissions and for other signal sensing purposes. In one particular form of such embodiment, the system includes a receiver, and at least two receiver chains in which each chain is communicatively connected with its own radio antenna. Also in this embodiment, the receiver is operative to process a first signal received via a first receiver chain and a first antenna, together with a second signal received via a second receiver chain and a second antenna, thereby enhancing reception of at least one incoming wireless transmission associated with the first and second signals. Also in this embodiment, the wireless communication system is operative to utilize the second receiver chain during at least one period of incoming wireless transmission for reception of a third signal not associated with the incoming wireless transmission. In this way, dual-use is made of the second receiver chain, but during this period the second receiver chain is receiving the third signal, and therefore during such period the second receiver and the second receiver chain are not available to receive the second signal, and thus reception of the wireless transmission is not enhanced during this period. Also in this embodiment, the wireless communication system is further operative, during said at least one period, to replace the second signal with a duplication of the first signal, in compensation for the unavailability of said second signal during the period when the third signal is received. Also in this embodiment, the substitution of a duplicated first signal for a second signal is not known by the receiver, which continues to act as though it is receiving two separate signals.

One embodiment is a method for seamlessly dual-using a receiver chain for receiving incoming transmissions and for other signal sensing purposes. In one particular form of this embodiment, a receiver of a wireless communication system enhances reception of at least one incoming wireless transmission by processing (i) a first signal associated the said incoming wireless transmission received via a first receiver chain and a first antenna, and (ii) a second signal associated with said incoming wireless transmission received via a second receiver chain and a second antenna. Also in this embodiment, the wireless communication system utilizes the second receiver chain during at least one period of reception, for receiving a third signal not associated with the incoming wireless transmission, thereby dual-using the second receiver chain, and consequently making the second signal unavailable in the receiver for enhancing reception during the at least one period. Also in this embodiment, during this at least one period the wireless communication system compensates for the unavailability of the second signal in said receiver by substituting to said receiver the second signal with a duplication of the first signal, thereby making said receiver unaware of said utilization requiring said substitution.

One embodiment is a method for dual-using a receiver chain for determining distortion characteristics of a power amplifier and for receiving incoming transmissions. In one particular form of such embodiment, a communication system transmits a first transmission via a first power amplifier having a first set of signal distortion characteristics, resulting in the first transmission having a distortion associated with the first set of signal distortion characteristics. Also in this embodiment, the communication system injects an attenuated version of the first transmission having the distortion, into a second receiver chain belonging to the communication system. Also in this embodiment, the communication system determines the first signal distortion characteristics of the first power amplifier analyzing the distortion of the attenuated version of the first transmission received via the second receiver chain. Also in this embodiment, the communication system receives, via the second receiver chain, an incoming transmission for decoding by the communication system, thereby dual-using the second receiver chain for both (i) the determining of the first signal distortion characteristics, and (ii) the receiving of the incoming transmission.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

As used herein, "dual-use" is a process in which a receiver chain alternates, according to some scheme, between receiving signals with information payloads and receiving other information signals for purposes of signal monitoring or improving the quality of signals.

As used herein, a "radio-frequency switching fabric" is hardware, software, or a combination of hardware and software that is capable of switching the reception of a radio receiver chain between a signal with information payload and a different signal.

As used herein, "inverse distortion" is the process of inserting a kind of distortion into a radio signal to offset, at least in part, the known distortion characteristics of a transmitter, a power amplifier, or some other hardware through which a radio signal may pass.

As used herein, "maximal-ratio-combining", sometimes abbreviated as "MRC", is one or more techniques employed as a method for diversity combining of radio signals in which the signals of the various channels are added together to improve the quality of the resulting combined signal.

As used herein, "MIMO" is an acronym for a multiple-input-multiple-output communication configuration, which is well known in the art.

As used herein, "pre-clipping" is a method by which an initial input sequence of modulated data of a wireless transmission is processed prior to clipping procedure. Pre-clipping may be associated with a decimation mechanism, or with a zero-padding mechanism by way of example.

Figure 1A:
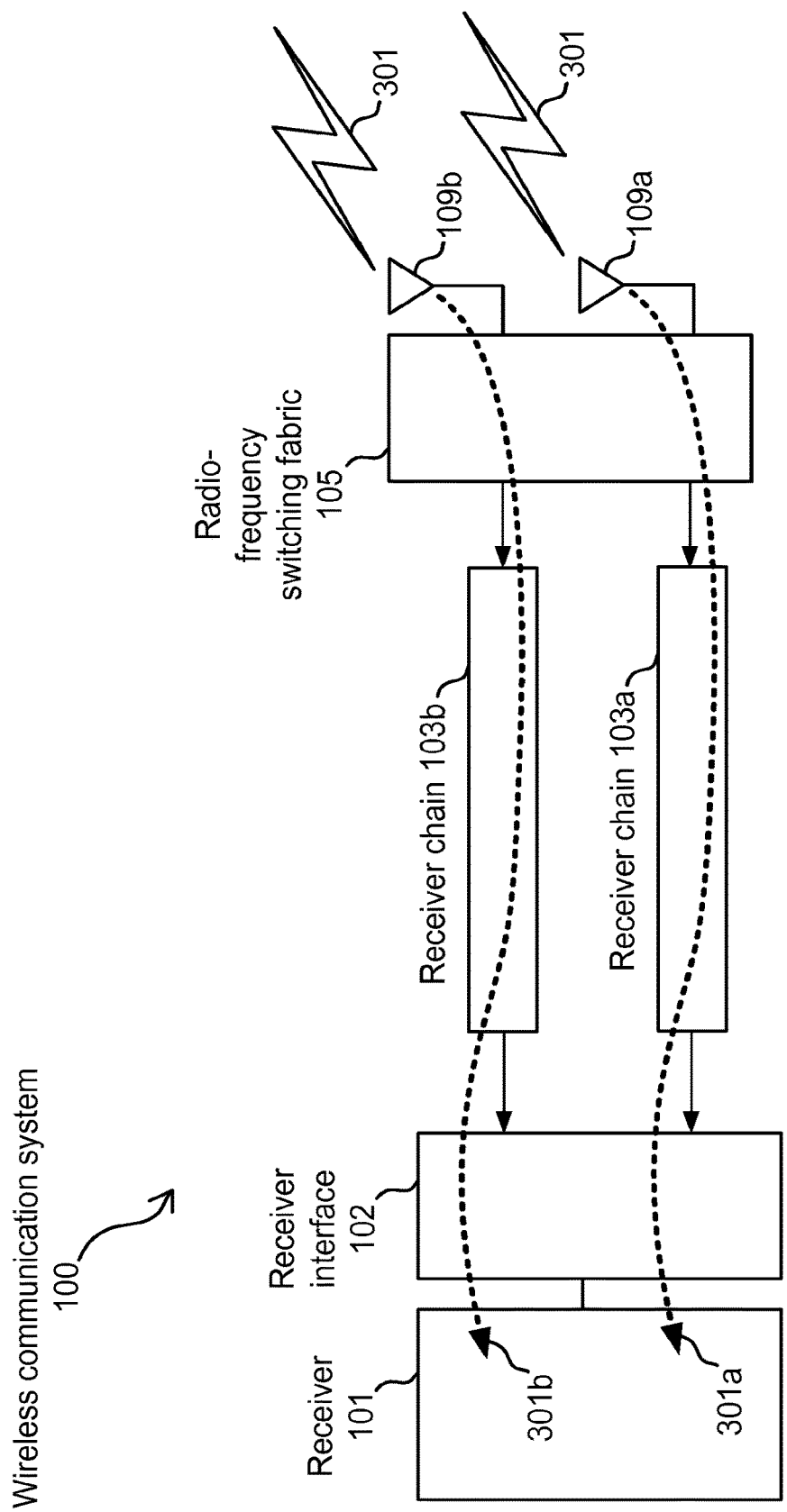
FIG. 1A illustrates one embodiment of a wireless communication system with two receiver chains processing two signals.

FIG. 1A illustrates one embodiment of a wireless communication system 100 with two receiver chains 103a and 103b processing two signals 301a and 301b respectively. FIG. 1A shows a wireless communication system 100, including a receiver 101 connected to and receiving signals from a receiver interface 102. The receive interface 102 is connected to and receives signals 301a, 301b from multiple receiver chains respectively, here marked as 103a and 103b, but there may be three or more such receiver chains. The receiver chains 103a and 103b in term are connected to and receive signals from a radio-frequency switching fabric 105, which is connected with and receives signals from multiple antennas, here 109a and 109b. It will be understood that there is a separate antenna for each receiver chain, here shown as antenna 109a communicatively connected to receiver chain 103a, and antenna 109b communicatively connected to receiver chain 103b, but there may be three or more sets of antennas and receiver chains. Each antenna receives the same transmission, here 301, and the signals 301a, 301b associated with transmission 301 are transported through the wireless communication system 100 until they are combined at receiver 101 using any kind of signal processing techniques to enhance the quality of the received signals. Transmission 301 may be an incoming wireless transmission.

Figure 1B:
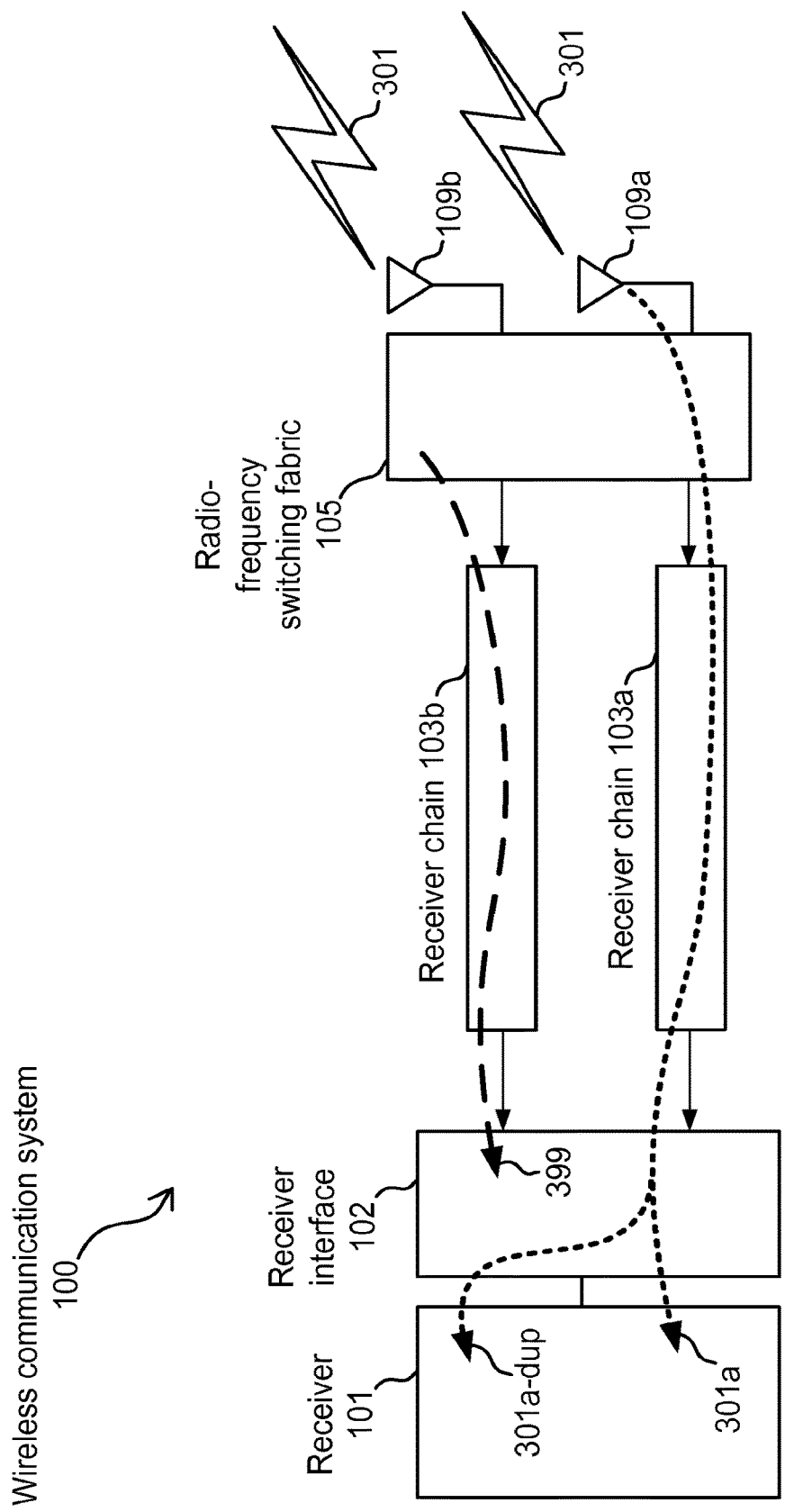
FIG. 1B illustrates one embodiment of a wireless communication system with two receiver chains processing one communication signal with an information payload and one communication signal for purposes of monitoring and testing, in which the signal with information payload has been duplicated at the receiver.

FIG. 1B illustrates one embodiment of a wireless communication system with two receiver chains processing one communication signal with an information payload and one communication signal for purposes of monitoring and testing, in which the signal with information payload has been duplicated at the receiver. The state of wireless communication system 100 depicted in FIG. 1B is different from the state of wireless system 100 depicted in FIG. 1A, in several respects. First, in FIG. 1B, the radio switching fabric 105 has switched the signal received by receiver chain 103b, such that the signal received by receiver chain 103b is not signal 301a received at 109a, nor signal 301b received at 109b, but rather a third signal 399 that is totally different from signals 301a, 301b. Second, in FIG. 1B, this third signal, 399, is conveyed by the wireless communication system 100 through receiver chain 103b, to receiver interface 102. Signal 399 may be analyzed on several parameters, and the results of such analysis may be used is several ways. Third, in FIG. 1B, the receiver interface 102 duplicates the signal 301a received at antenna 109a and conveyed through receiver chain 103a, and conveys this duplicated signal 301a-dup to receiver 101. At substantially all times during which the communication system is operating for reception of transmission 301, receiver 101 receives either two signals 301a and 301b, or two signals 301a and 301a-dup. As described herein, receiver chain 103b is operating in dual-mode, sometimes conveying communications 301b from antenna 109b, and sometimes conveying a third signal 399 from the radio-frequency switching fabric 105.

Figures 2A, 2B:
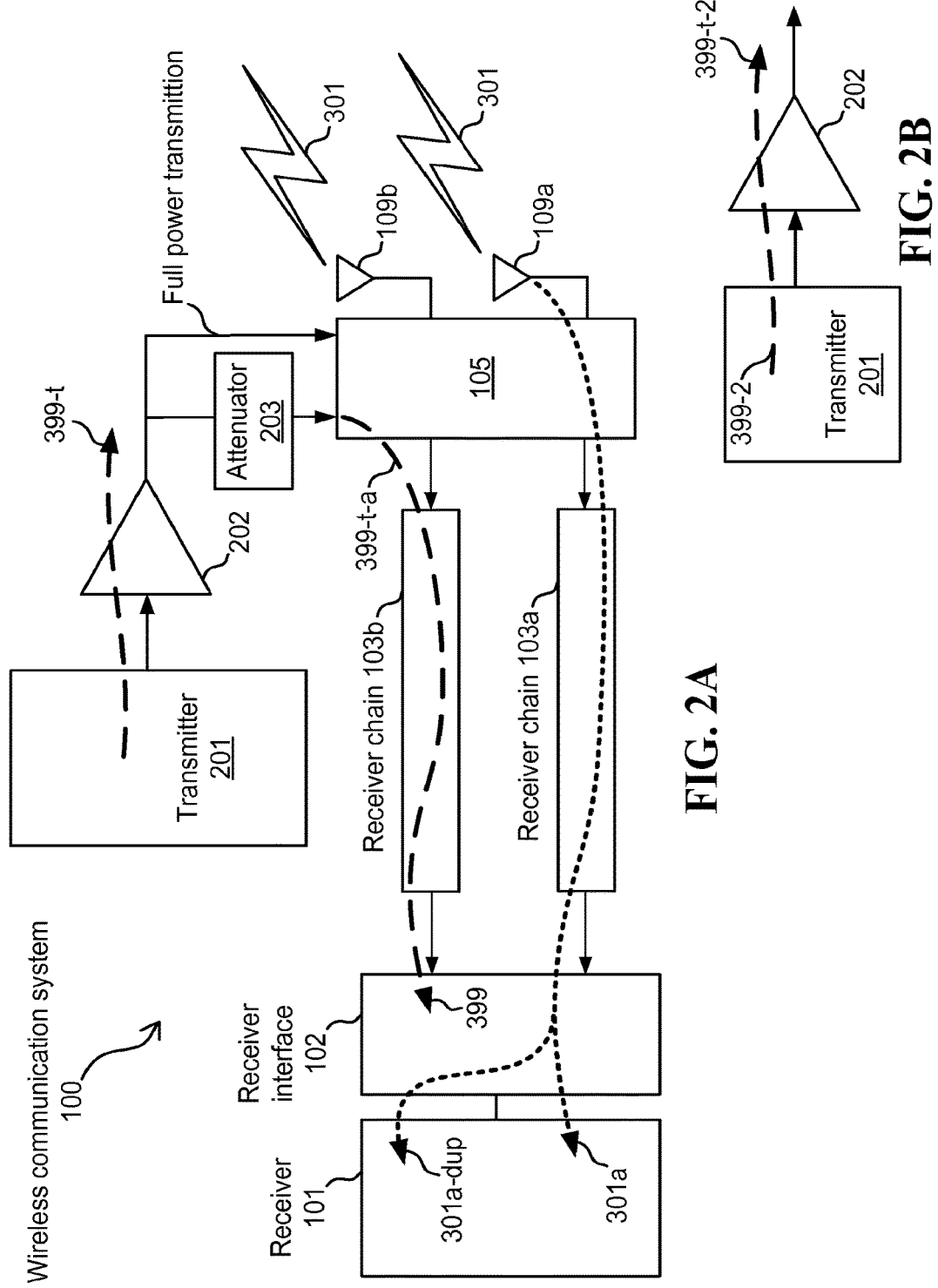
FIG. 2A illustrates one embodiment of a wireless communication system with two receiver chains processing one communication signal with an information payload and one communication signal for purposes of monitoring and testing distortions introduced by a power amplifier, in which the signal for monitoring and testing has passed through an attenuator.
FIG. 2B illustrates one embodiment of a signal being transmitted by a transmitter through a power amplifier, in which the signal has been pre-distorted by insertion of an inverse distortion in order to counter at least in part some of the distortion characteristics of the power amplifier.

FIG. 2A illustrates one embodiment of a wireless communication system with two receiver chains processing one communication signal with an information payload and one communication signal for purposes of monitoring and testing distortions introduced by a power amplifier, in which the signal for monitoring and testing has passed through an attenuator. FIG. 2A differs from FIG. 1B in several respects. First, in FIG. 2A, there is an additional transmitter 201 that is transmitting a signal. Second, in FIG. 2A the signal transmitted by transmitter 201 travels through a power amplifier 202, which amplifies the transmission signal but in so doing may introduce distortions due to imperfects in amplifier 202. Third, in FIG. 2A the signal passing through power amplifier 202 then passes through an attenuator 203 which attenuates the signal. The attenuated signal 399-t-a passes through the radio-frequency switching fabric 105 to receiver chain 103b, and then to receiver interface 102. The signal 399-t-a, which becomes signal 399 at receiver interface 102, may be analyzed for distortion characteristics, and actions may be taken to counter-act such distortion, as shown in FIG. 2B below.

FIG. 2B illustrates one embodiment of a signal being transmitted by a transmitter through a power amplifier, in which the signal has been pre-distorted by insertion of an inverse distortion in order to counter at least in part some of the distortion characteristics of the power amplifier. In FIG. 2B, transmitter 201 transmits a modified signal 399-2, in that the modified signal has had inserted into it inverse distortion to counteract, at least in part, the distortions of transmitter 201 or of power amplifier 202 as determined in the analysis of signal 399-t-a at receiver interface 102. Modified signal 399-2 is now transmitted by transmitter 201, amplified by power amplifier 202, and will continue through the wireless communication system 100.

Figure 3:
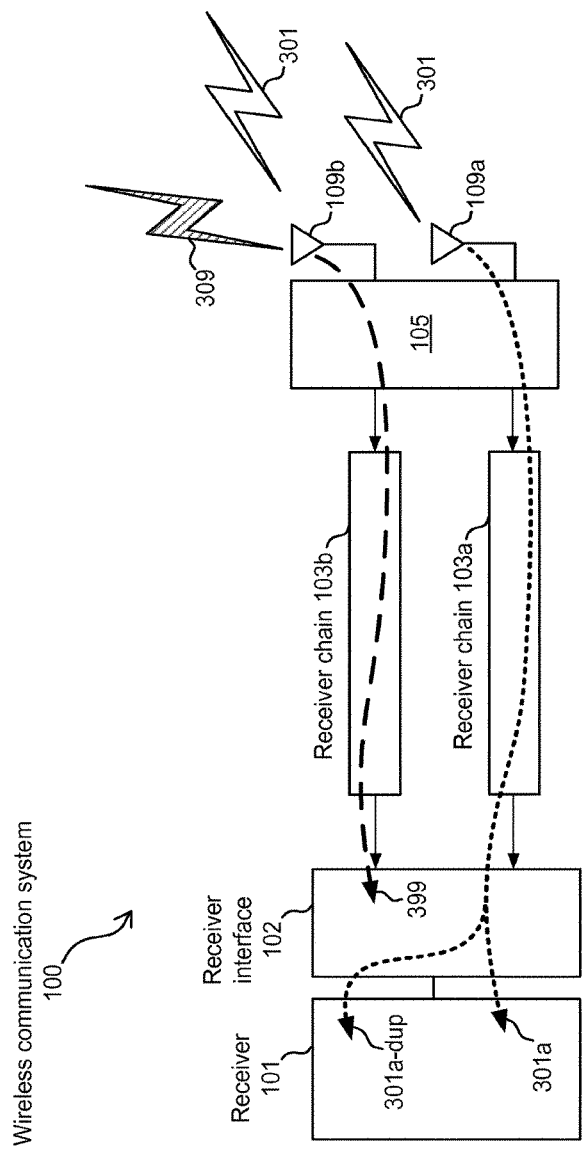
FIG. 3 illustrates one embodiment of a wireless communication system with two receiver chains processing one communication signal with an information payload and one communication signal for purposes of monitoring and testing, in which the signal with information payload has been duplicated at the receiver.

FIG. 3 illustrates one embodiment of a wireless communication system with two receiver chains processing one communication signal with an information payload and one communication signal for purposes of monitoring and testing, in which the signal with information payload has been duplicated at the receiver. FIG. 3 is different from FIG. 2A in that in FIG. 3 there is no transmitter 201 or power amplifier 202 or attenuator 203, but rather radio-switching fabric 105 has switched the signal received by antenna 109b from transmission 301 to transmission 309 that is different from transmission 301. It will be understood that transmission 309 may be a different frequency than the frequency for 301, or may be a different time slice from the time slice of transmission 301, or may be a different code/standard from the code/standard of transmission 301, or may be some combination of different frequencies, time slices, and codes/standards. The transmission 309, also referred to as an incoming wireless transmission, received at antenna 109b is conveyed through radio-switching fabric 105 to receiver chain 103b, and then to radio interface 102 in the form of signal 399. There may be multiple reasons for switching a transmission from 301 to 309. For example, the wireless communication system 100 may wish to determined if a transmission band represented by transmission 309 is occupied with traffic, and if not, whether communication traffic may be placed on that band. For example, the wireless communication system 100 may wish to determine if there is possible interference with transmission 301 from transmission 309, and if so, to determine how such interference may be reduced or avoided.

Figure 4:
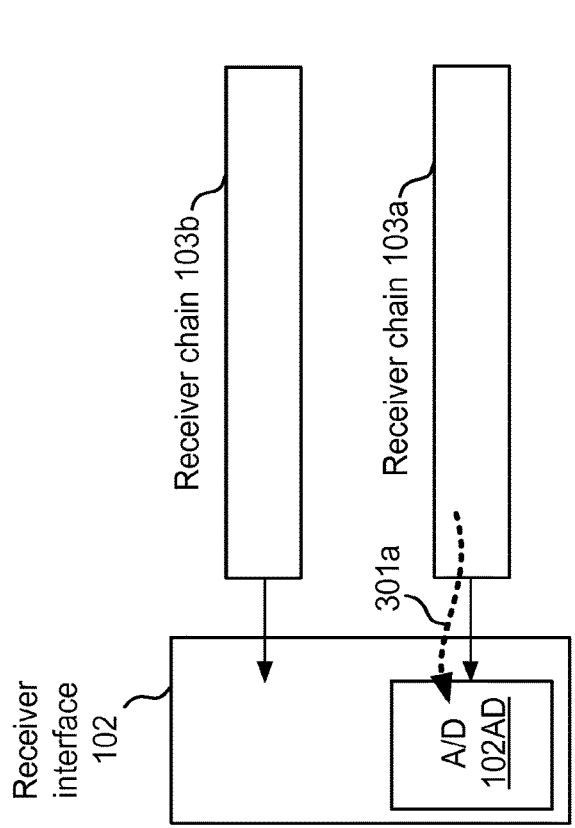
FIG. 4 illustrates one embodiment of a receiver interface that may be digital, and that includes an analog-to-digital converter operative to convert a first signal that is analog into a digital form.

FIG. 4 illustrates one embodiment of a receiver interface that may be digital, and that include an analog-to-digital converter operative to convert a first signal that is analog into a digital form. FIG. 4 shows one possible embodiment for the duplication of signal 301a. In FIG. 4, first receiver chain 103a receives signal 301a, and sends it to receiver interface 102. Receiver interface 102 includes an analog-to-digital converter 102AD, which converts signal 301a from analog into digital. When signal 301a is then duplicated and sent to receiver 101 as 301a-dup, it is duplicated and sent as a digital rather than an analog signal. In other embodiments, signal 301a would remain in analog form, but this would require receiver interface 102 to duplicate analog signal 301a and then send it, in analog form.

Figure 5:
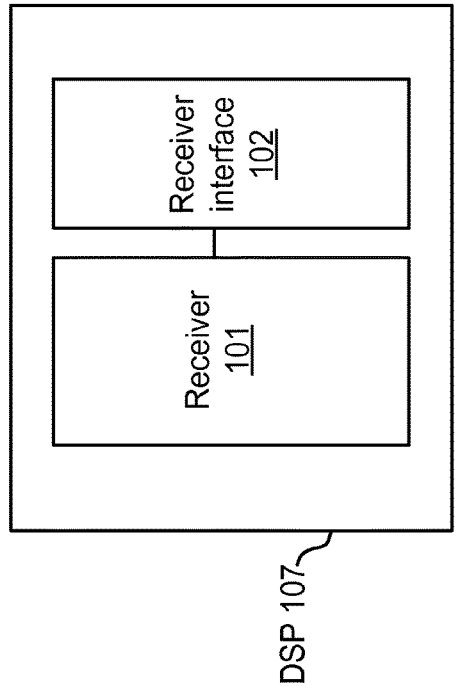
FIG. 5 illustrates one embodiment of a receiver and a receiver interface that have been implemented in a digital-signal-processor.

FIG. 5 illustrates one embodiment of a receiver and a receiver interface that has been implemented in a digital-signal-processor. FIG. 5 shows receiver interface 102 and receiver 101, that have been implemented in a DSP 107, which is one way by which the receiver interface 102 and receiver 101 may be implemented and structured.

One embodiment is a wireless communication system 100 operative to seamlessly dual-use a receiver chain 103b for receiving incoming transmissions and for other signal sensing purposes. In one specific embodiment, the system 100 includes receiver 101, a first receiver chain 103a associated with a first antenna 109a, and a second receiver chain 103b associated with a second antenna 109b. Also in this specific embodiment, the receiver 101 is operative to process a first signal 301a received via the first receiver chain 103a and the first antenna 109a, together with a second signal 301b received via the second receiver chain 103b and the second antenna 109b, thereby enhance reception of at least one incoming wireless transmission 301 associated with the first 301a and second signals 301b. Also in this specific embodiment, the wireless communication system 100 is operative to utilize the second receiver chain 103b, during at least one period of the incoming wireless transmission 301, for reception of a third signal 399 not associated with the incoming wireless transmission 301, thereby making dual-use of the second receiver chain 103b, and consequently making the second signal 301b unavailable in the receiver 101 for enhancement during the at least one period. Also in this specific embodiment, the wireless communication system 100 is further operative, during the at least one period, to substitute the second signal 301b with a duplication 301a-dup of the first signal 301a, in compensation for the unavailability of the second signal 301b in the receiver 101, and without any knowledge of said receiver 101 regarding such utilization requiring said substitution.

In an alternative embodiment to the system just described, the wireless communication system 100 further includes a receiver interface 102 operative to perform the duplication of signal 301a and compensation for the loss of signal 301b.

In one variation of the alternative embodiment just described, further the receiver interface 102 is digital and includes an analog-to-digital converter 102AD operative to convert the first signal 301a into a digital form. In this variation, the receiver 101 is also digital, thereby enabling duplication of signal 301a and compensation for loss of signal 301b to be made at the digital level.

In one configuration of the variation just described, further the receiver 101 and the receiver interface 102 are implemented in a digital-signal-processor 107.

In a second variation of the alternative embodiment described above, the wireless communication system 100 also includes a power amplifier 202 having certain signal distortion characteristics, a radio-frequency attenuator 203, and a radio-frequency switching fabric 105. Also in this second variation, the wireless communication system 100 is further operative to transmit a first transmission 399-*t* via the first power amplifier 202, resulting in the first transmission 399-*t* having a distortion associated with the signal distortion characteristics. Also in this second variation, the wireless communication system 100 is further operative to use the radio-frequency switching fabric 105 and the radio-frequency attenuator 203 to bypass the second antenna 109*b*, and to inject, during the at least one period of said incoming wireless transmission 301, an attenuated version 399-*t-a* of said first transmission 399-*t* having the distortion, into the second receiver chain 103*b*, wherein said attenuated version 399-*t-a* becomes the third signal 399. Also in this second variation, the wireless communication system 100 is operative to determine the first signal distortion characteristics of the power amplifier 202, via analysis of the distortion present in the third signal 399 received via said second receiver chain 103*b*.

Figure 6:
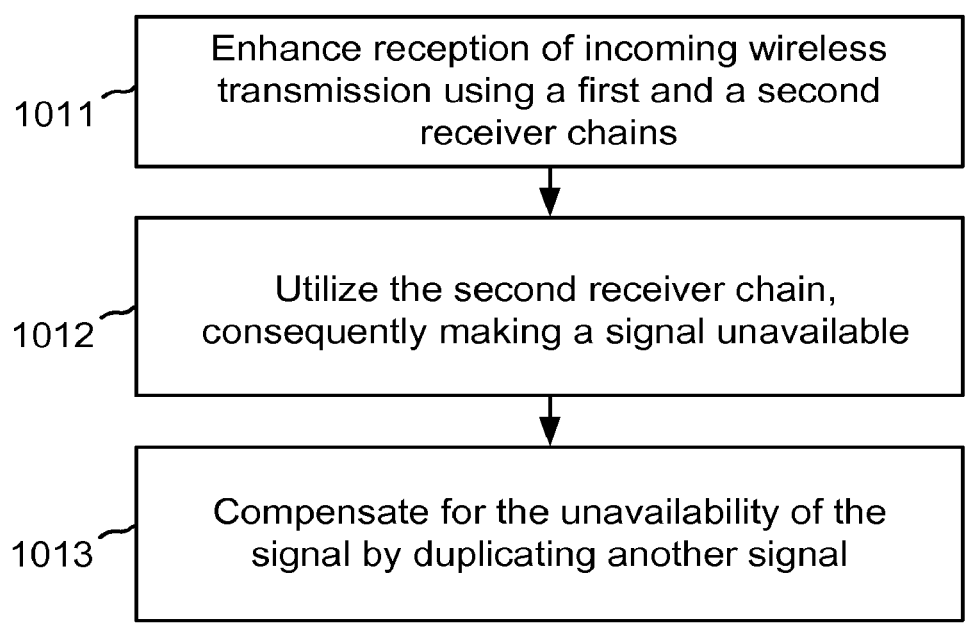
FIG. 6 illustrates one embodiment of a method by which a wireless communication system may seamlessly dual-use a receiver chain for receiving incoming transmissions and for other signal sensing purposes.

FIG. 6 illustrates one embodiment of a method by which a wireless communication system may seamlessly dual-use a receiver chain for receiving incoming transmissions and for other signal sensing purposes. In step 1011, a wireless communication system 100 enhances, in a receiver 101, reception of at least one incoming wireless transmission 301, by processing (i) a first signal 301*a* associated with the incoming wireless transmission received via a first receiver chain 103*a* and a first antenna 109*a*, and (ii) a second signal 301*b* associated with the incoming wireless transmission received via a second receiver chain 103*b* and a second antenna 109*b*. In step 1012, the wireless communication system 100 utilizes the second receiver chain 103*b*, during at least one period of the reception, for receiving a third signal 399 not associated with the incoming wireless transmission 301, thereby dual-using the second receiver chain 103*b*, and consequently making the second signal 301*b* unavailable in the receiver 101 for enhancing during the at least one period. In step 1013, the wireless communication system 100 compensates, during the at least one period, for the unavailability of the second signal 301*b* in the receiver 101, by substituting to the receiver 101 the second signal 301*b* with a duplication 301*a*-dup of the first signal 301*a*, thereby making the receiver 101 unaware of the utilization requiring said substitution.

In a first alternative embodiment to the method just described, the wireless communication system 100 transmits 201, a first transmission 399-*t* via a power amplifier 202 having certain signal distortion characteristics, resulting in the first transmission 399-*t* having a distortion associated with the first signal distortion characteristics. Also in this alternative embodiment, the wireless communication system 100 injects, during the at least one period of the reception, an attenuated version 399-*t-a* of the first transmission 399-*t* having the distortion, into the second receiver chain 103*b*, wherein the attenuated version 399-*t-a* becomes the third signal 399, thereby bypassing the second antenna 109*b* and facilitating said utilization requiring said substitution. Also in this first alternative embodiment, the wireless communication system 100 determines the signal distortion characteristics of the power amplifier 202, by analyzing the distortion present in the third signal 399 received via said second receiver chain 103*b*.

In a first variation of the first alternative embodiment just described, further the enhancement is adversely affected as a result of the duplication during the at least one period. In order to reduce or even minimize these adverse impacts, the wireless communication system 100 reduces the length of the at least one period to a necessary minimum. In one configuration of the first variation just described, the necessary minimum duration of the at least one period is at least 100 microseconds, but not longer than 10 milliseconds, thereby allowing sufficient time for the wireless communication system 100 to analyze the distortion present in the third signal received via the second receiver chain 103*b* during the at least one period.

In a second variation of the first alternative embodiment described above, the wireless communication system 100 further operates in a frequency-division-duplex mode, such that at least most of the transmitting of the first transmission 399-*t* occurs substantially simultaneously with the reception of at least one incoming wireless transmission 301, and such that the transmitting is done at a first frequency, and the reception is done at a second frequency.

In one configuration of the second variation just described, further the wireless communication system 100 configures the second receiver chain 103*b* to operate in the second frequency during the enhancement. Also in such configuration, the wireless communication system 100 configures the second receiver chain 103*b* to operate in the first frequency during the utilization of the second receiver chain 103*b*.

In a second alternative embodiment to the method described above, further the incoming wireless transmission 301 belongs to a first frequency band. Also in this second alternative embodiment, the wireless communication system 100 receives, during the at least one period of the reception, via the second receiver chain 103*b*, the third signal 399 associated with a second wireless transmission 309 (FIG. 3) belonging to a second frequency band, thereby facilitating monitoring of said second frequency band.

In one variation of the second alternative embodiment just described, further the enhancement is adversely affected during the at least one period, as a result of the duplication of signal 301*a*. Therefore, to reduce the adverse effect on the enhancement, the wireless communication system 100 keeps the at least one period to a necessary minimum.

In one configuration of the variation just described, further the necessary minimum is at least one millisecond, but not longer than 10 milliseconds, thereby allowing sufficient time for the monitoring of the second frequency band during the at least one period.

In a third alternative embodiment to the method described above, further the enhancement is associated with maximal-ratio-combining. Also in this third alternative embodiment, the receiver 101 combines the first 301*a* and second signals 301*b* using maximal-ratio-combining techniques, thereby enhancing a signal-to-noise ratio associated with the incoming wireless transmission 301.

In a fourth alternative embodiment to the method described above, further the enhancement is associated with spatial-multiplexing. Also in this fourth alternative embodiment, receiver 101, using spatial-multiplexing reception techniques, decodes at least two transmission streams from the first 301*a* and second signals 301*b*, thereby enhancing reception rates associated with the incoming wireless transmission 301.

In one variation of the fourth alternative embodiment described above, further the first 103a and second receiver chains 103b are parts of a multiple-input-multiple-output communication configuration.

In a fifth alternative embodiment to the method described above, further the at least one period associated with the utilization is essentially periodic and is kept short relative to periods associated with the enhancement.

In one variation of the fifth alternative embodiment described above, the at least one period associated with the utilization is shorter than the periods associated with the enhancement by a factor of between 100,000 and 10,000,000.

Figure 7:
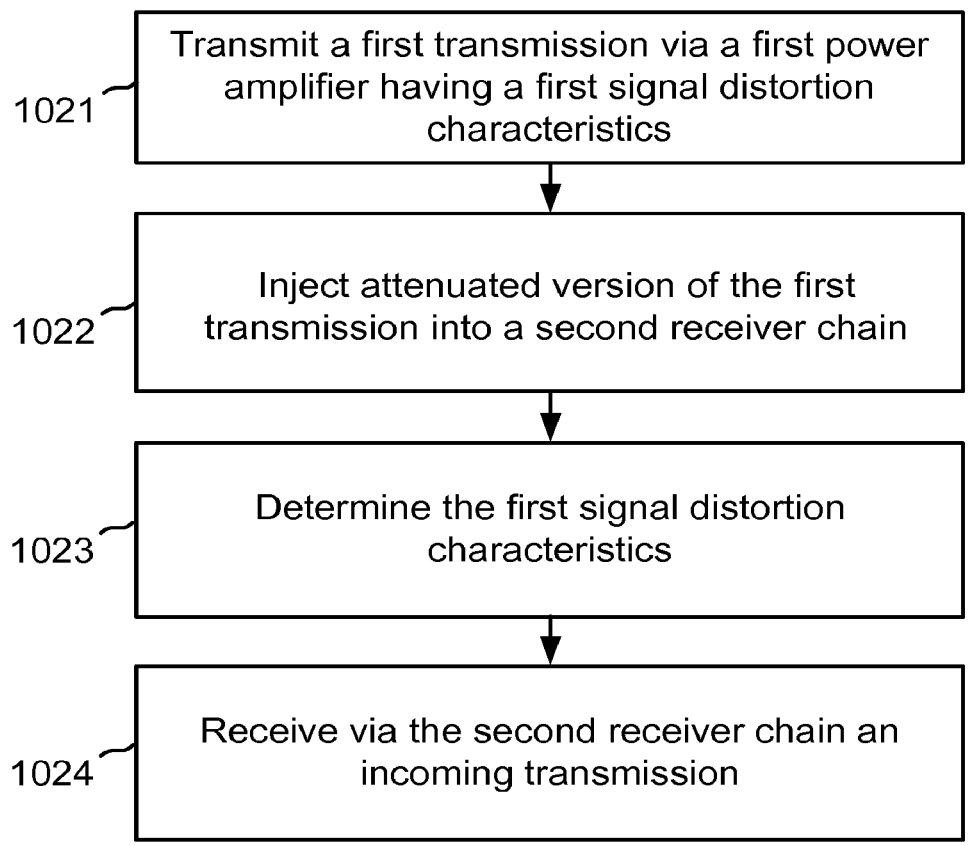
FIG. 7 illustrates one embodiment of method by which a wireless communication system may dual-use a receiver chain for determining distortion characteristics of a power amplifier and for receiving incoming transmissions with information payload.

FIG. 7 illustrates one embodiment of a method by which a wireless communication system may dual-use a receiver chain for determining distortion characteristics of a power amplifier and for receiving incoming transmissions with information payload. In step 1021, a wireless communication system 100 transmits a first transmission 399-t via a first power amplifier 202 having certain signal distortion characteristics. The result is that the first transmission has the distortion associated with the distortion characteristics of the power amplifier 202. In step 1022, the wireless communication system 200 injects an attenuated version 399-t-a, of the first transmission 399-t having the distortion, into a second receiver chain 103b belonging to the communication system 101. In step 1023, the wireless communication system 100 determines certain signal distortion characteristics of the power amplifier 202, by analyzing the distortion of the attenuated version 399-t-a of the first transmission 399-t received via the second receiver chain 103b as signal 399. In step 1024, the wireless communication system receives, via the second receiver chain 103b, an incoming transmission 301 for decoding by said communication system 100, thereby dual-using the second receiver chain 103b for both (i) determining the first signal distortion characteristics, and (ii) receiving the incoming transmission 301.

In a first alternative embodiment to the method just described, further the wireless communication system 100 pre-distorts 399-2 a second transmission intended for transmission via the power amplifier 202, using the determination of the first signal distortion characteristics. Also in this embodiment, the wireless communication system 100 transmits the second transmission 399-t-2 pre-distorted, via the power amplifier 202, thereby at least partially countering the signal distortion characteristics of the power amplifier 202.

In a second alternative embodiment to the method described above, further the first transmission 399-t is a radio-frequency transmission, and the second receiver chain 103b is a radio-frequency receiver chain.

In one variation of the second alternative embodiment just described, further the wireless communication system 100 couples the power amplifier 202 with the second receiver 103b chain prior to the injection, using a first radio-frequency coupling mechanism comprising the attenuator 203 and the radio-frequency switching fabric 105, thereby facilitating the injection.

In one configuration of the variation just described, further the wireless communication system 100 releases the coupling prior to the reception of the incoming transmission 301, thereby facilitating the reception of said incoming transmission 301

This description presents numerous alternative embodiments. Further, various embodiments may generate or entail various usages or advantages. For example, using the radio-frequency switching fabric 105 to switch signals in receiver chain 103b allows dual-use of receiver chain 103b, which may reduce the overall amount of hardware required by the wireless communication system 100.

Figure 8A:
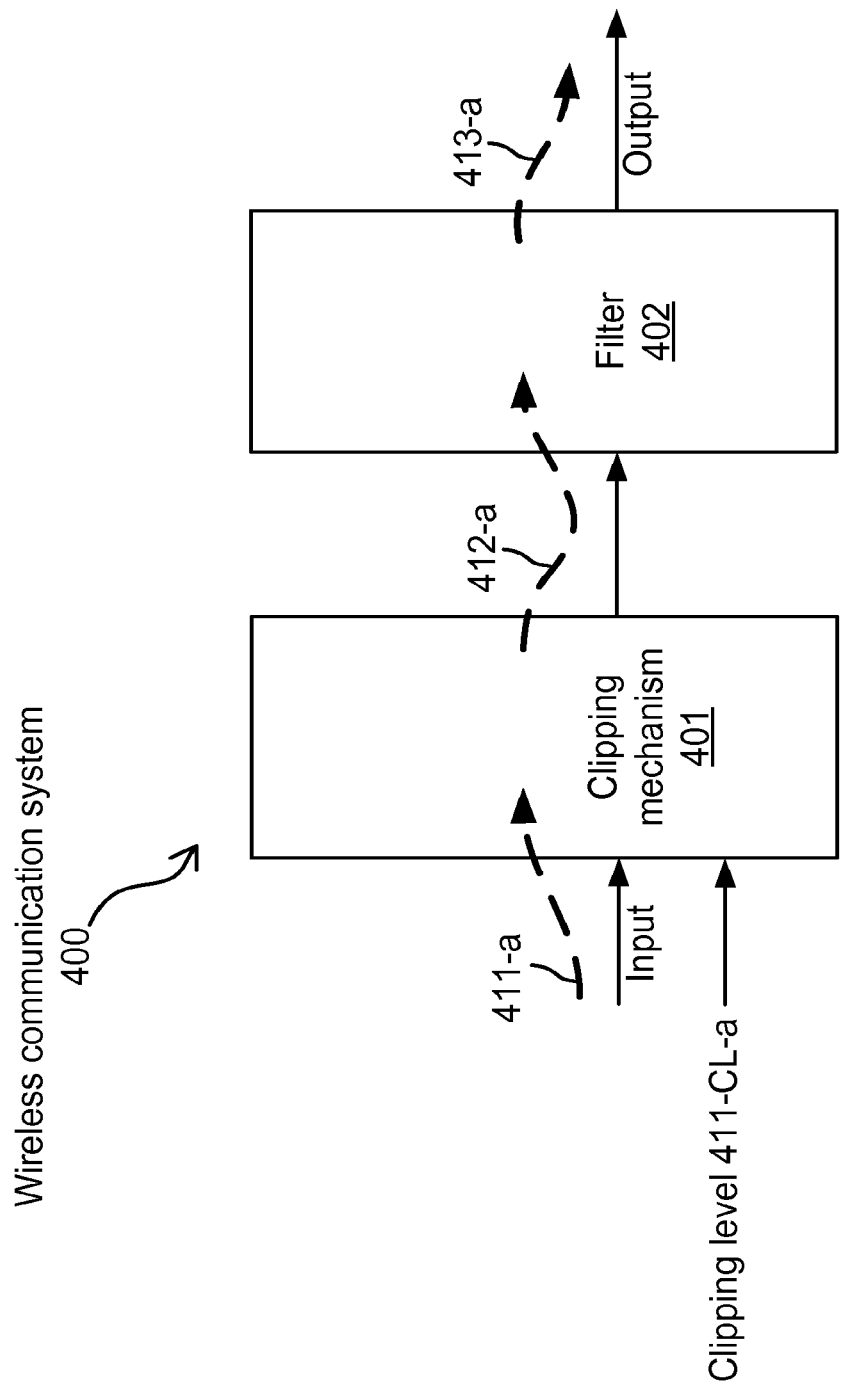
FIG. 8A illustrates one embodiment of a wireless communication system a clipping mechanism and a filter for a first iteration of clipping a signal.

FIG. 8A illustrates one embodiment of a wireless communication system 400 a clipping mechanism and a filter for a first iteration of clipping a signal. A sequence of modulated data 411-a is inputted as a signal into a clipping mechanism 401. The clipping mechanism 401 has been set at first clipping level 411-CL-a, and clips the signal according to this first level. The clipped signal of modulated data is outputted as 412-a, and is then passed through a filter 402, which executed out-of-band signal filtering, and outputs the signal 413-a as a first-level clipped and filtered sequence of modulated data. In some embodiments, this signal 413-a would now be sent to an up-converter and a power amplifier (not shown in FIG. 8A). In some embodiments, this signal 413-a is sent back into the clipping and filtering system, as explained in FIG. 8B below.

Figure 8B:
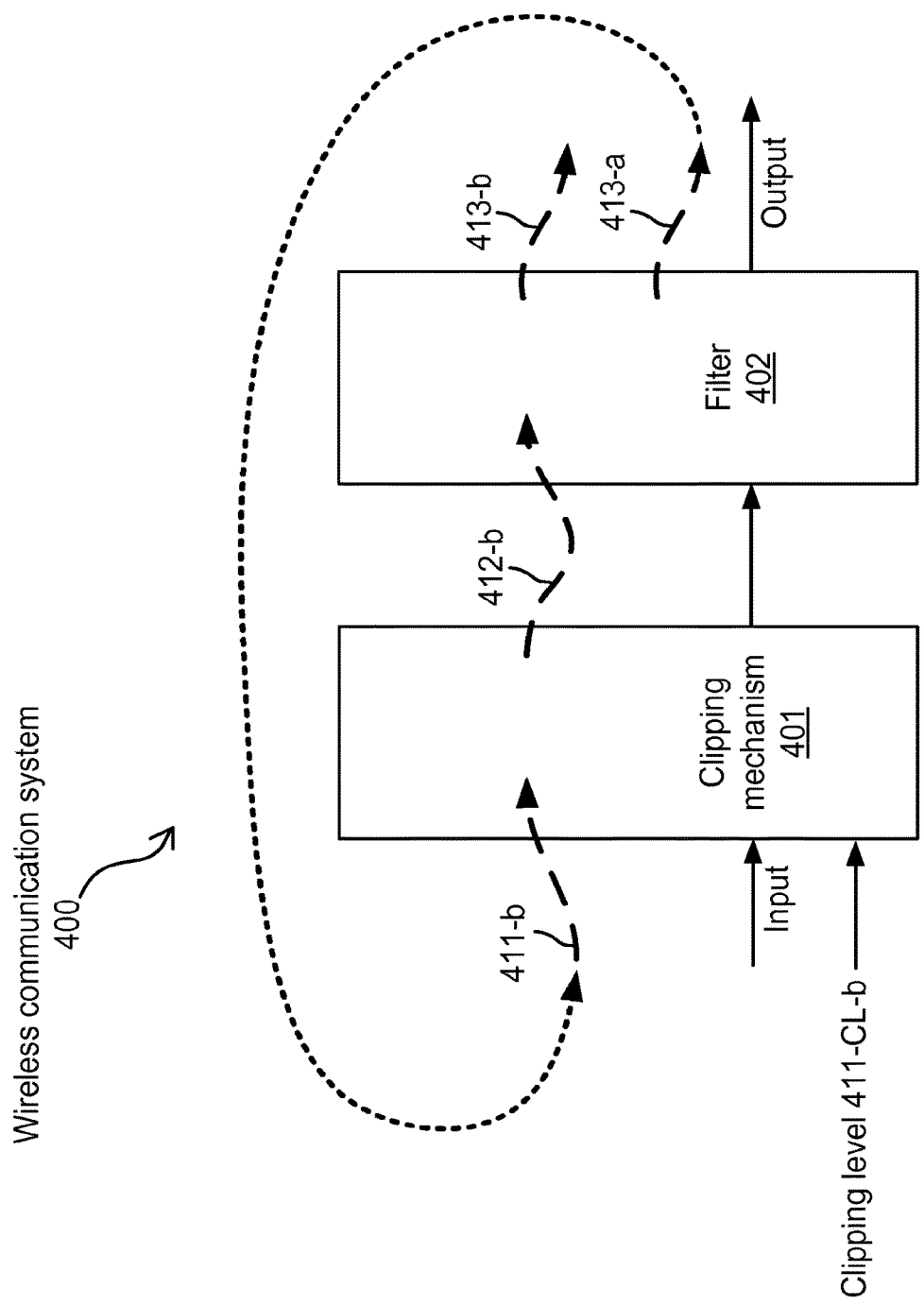
FIG. 8B illustrates one embodiment of a wireless communication system a clipping mechanism and a filter for a second iteration of clipping a signal.

FIG. 8B illustrates one embodiment of a wireless communication system 400 a clipping mechanism and a filter for a second iteration of clipping a signal. The clipped and filtered sequence of modulated data 413-a from FIG. 8A is now fed into the system as new signal 411-b. Sequence of modulated data 411-b is inputted as a signal into the clipping mechanism 401. The clipping mechanism 401 has now been set at second clipping level 411-CL-b, and clips the signal according to this second level. The clipped signal of modulated data is outputted as 412-b, and is then passed through the filter 402, which executes out-of-band signal filtering, and outputs the signal 413-b as a second-level clipped and filtered sequence of modulated data. In some embodiments, this signal 413-b would now be sent to an up-converter and a power amplifier (not shown in FIG. 8B). In some embodiments this signal 413-b is sent back into the clipping and filtering system, as explained in FIG. 8C below.

Figure 8C:
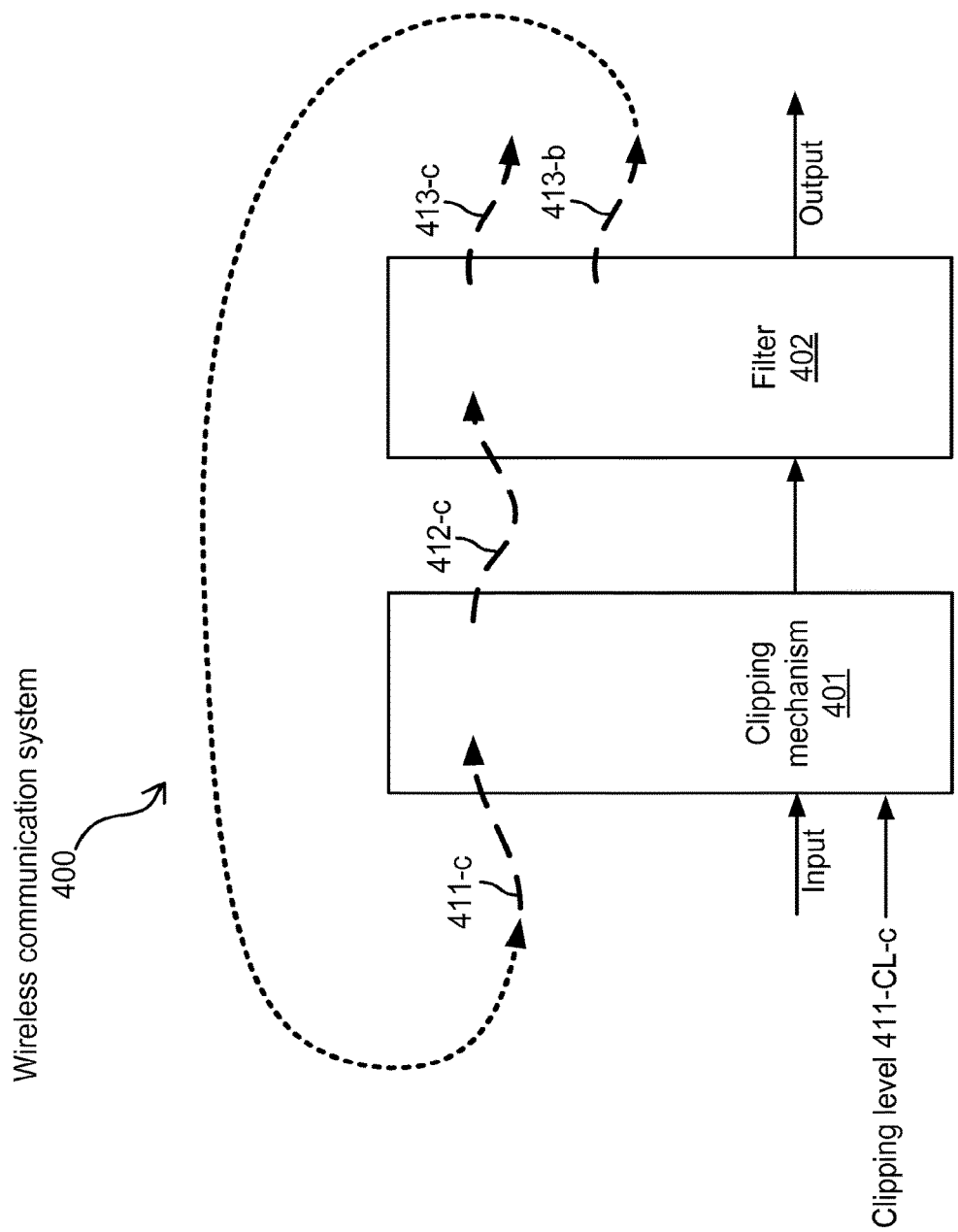
FIG. 8C illustrates one embodiment of a wireless communication system a clipping mechanism and a filter for a third iteration of clipping a signal.

FIG. 8C illustrates one embodiment of a wireless communication system a clipping mechanism and a filter for a third iteration of clipping a signal. The clipped and filtered sequence of modulated data 413-b from FIG. 8B is now fed into the system as new input 411-c. Sequence of modulated data 411-c is inputted as a signal into the clipping mechanism 401. The clipping mechanism 401 has now been set at third clipping level 411-CL-c, and clips the signal according to this third level. The clipped signal of modulated data is outputted as 412-c, and is then passed through the filter 402, which executed out-of-band signal filtering, and outputs the signal 413-c as a third-level clipped and filtered sequence of modulated data. In some embodiments, this signal 413-c would now be sent to an up-converter and a power amplifier (not shown in FIG. 8C). In some embodiments, this modulated signal will pass through fourth, fifth, or additional rounds of clipping and filtering.

Figure 9A:
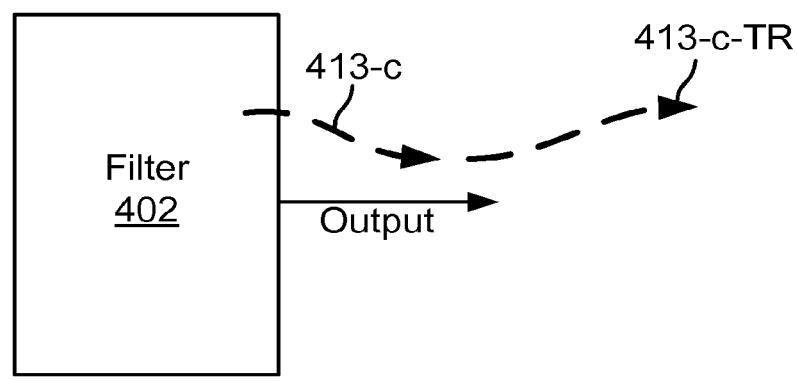
FIG. 9A illustrates one embodiment of a wireless communication sub-system with a filter for out-of-band signal filtering.

FIG. 9A illustrates one embodiment of a wireless communication sub-system with a filter 402 for out-of-band signal filtering. As shown in FIG. 9A, filter 402 has outputted third level clipped and filtered sequence of data 413-c. In this embodiment shown, three iterations have produced a signal 413-c which is sufficiently good so that it need not be sent for a fourth iteration, but rather is sent as 413-c-TR to an up-converter and a power amplifier (not shown in FIG. 9A), from where it will be transmitted.

Figure 9B:
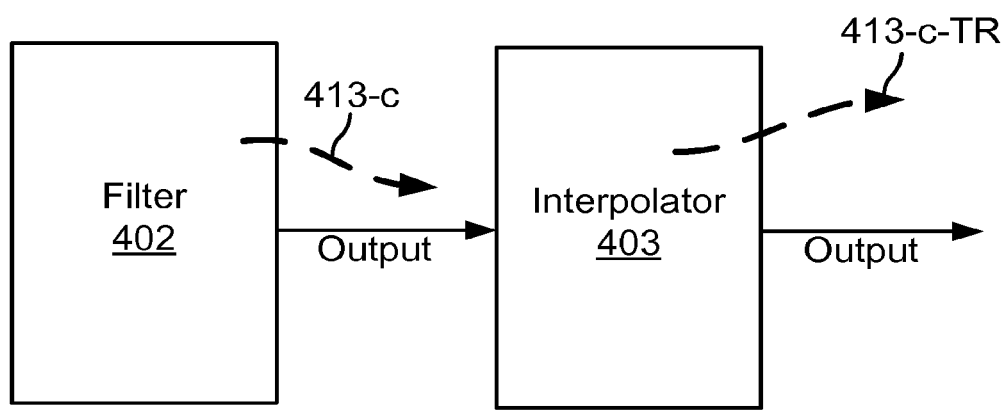
FIG. 9B illustrates one embodiment of a wireless communication sub-system with a filter and an interpolator for out-of-band signal filtering.

FIG. 9B illustrates one embodiment of a wireless communication sub-system with a filter 402 and an interpolator 403 for out-of-band signal filtering. The sequence of data 413-c is inputted into an interpolator 403, which further conditions the data with interpolation to produce signal 413-c-TR ready to be sent to an up-converter and a power amplifier (not shown in FIG. 9B), after which the amplified signal will be transmitted.

Figure 10A:
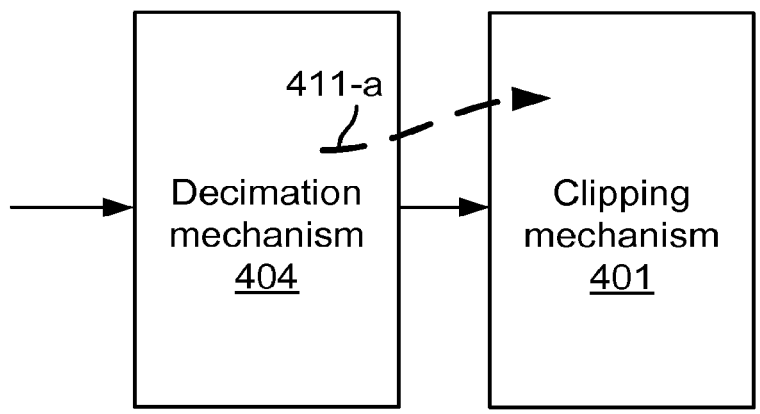
FIG. 10A illustrates one embodiment of a wireless communication sub-system with a decimation mechanism and a clipping mechanism.

FIG. 10A illustrates one embodiment of a wireless communication sub-system with a decimation mechanism 404 and a clipping mechanism 401. In FIG. 10A, before sequence of data 411-a is sent into a clipping mechanism 401 at a first level of clipping 411-CL-a, the sequence of data 411-a passes through a decimation mechanism 404, which conditions the data to create a decimated sequence of data. 411-a, in decimated form, is then sent to clipping mechanism 401 for a first level clipping.

Figure 10B:
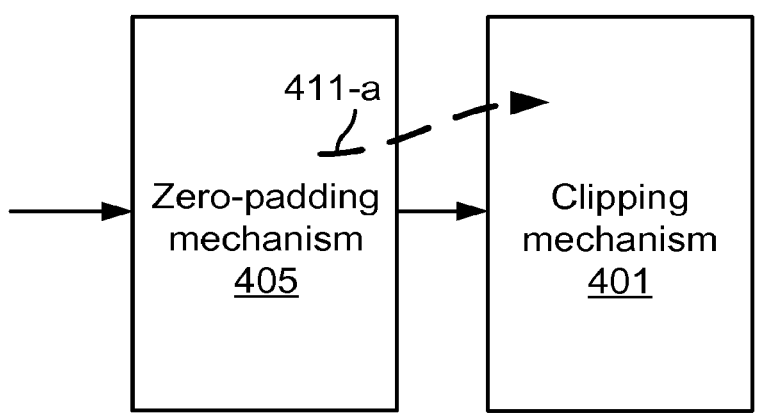
FIG. 10B illustrates one embodiment of a wireless communication sub-system with a zero-padding mechanism and a clipping mechanism.

FIG. 10B illustrates one embodiment of a wireless communication sub-system with a zero-padding mechanism 405 and a clipping mechanism 401. In FIG. 10B, before sequence of data 411-a is sent into a clipping mechanism 401 at a first level of clipping 411-CL-a, the sequence of data 411-a passes through a zero-padding mechanism 404, which conditions the data to create a zero-padded sequence of data. 411-a, in zero-padded form, is then sent to clipping mechanism 401 for a first level clipping.

Figure 11A:
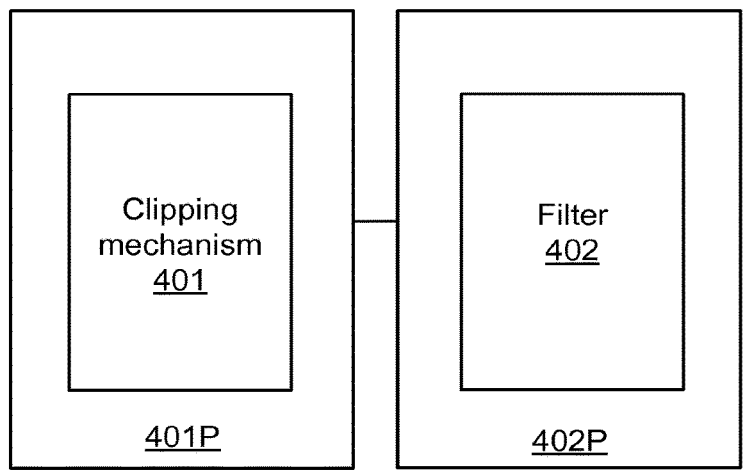
FIG. 11A illustrates one embodiment of a clipping mechanism and a filter at the microprocessor level.

FIG. 11A illustrates one embodiment of a clipping mechanism and a filter at the microprocessor level. In FIG. 11A, the clipping mechanism 401 is a processor, and the filter 402 is entirely different processor, as shown. In alternative embodiments, the clipping mechanism 401 and the filter 402 may be co-located on one processor.

Figure 11B:
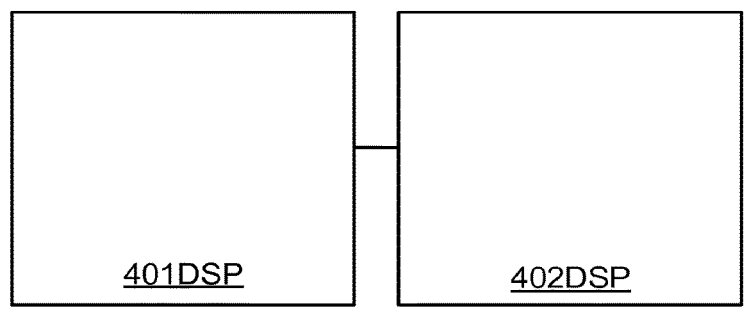
FIG. 11B illustrates one embodiment of a clipping mechanism and a filter at the DSP level.

FIG. 11B illustrates one embodiment of a clipping mechanism and a filter at the DSP level. In FIG. 11A, a first processor 401DSP is a digital signal processor ("DSP") and includes the clipping mechanism 401. In FIG. 11A, a second processor is a digital signal processor 402DSP, and includes the filter. In alternative embodiments, the clipping mechanism 401 and the filter 402 are co-located on one DSP.

Figure 12:
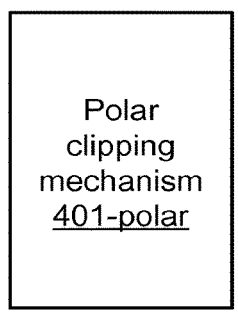
FIG. 12 illustrates one embodiment of a polar clipping mechanism.

FIG. 12 illustrates one embodiment of a polar clipping mechanism 401-polar. In FIG. 12, the clipping mechanism, which was 401 in prior figures, is now a polar clipping mechanism 401-polar, which executes polar clipping. In this embodiment, non-polar clipping, which was executed by clipping mechanism 401, does not occur, and is replaced by polar clipped executed by 401-polar.

Figure 13:
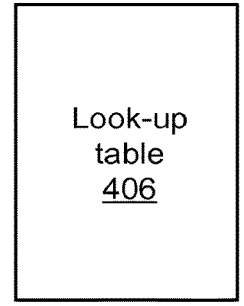
FIG. 13 illustrates one embodiment of a lookup table for determining a clipping level of a wireless transmission.

FIG. 13 illustrates one embodiment of a look-up table 406 for determining a clipping level of a wireless transmission. In FIG. 13, all iterations, where it is only the first level 411-CL-a, or the first two levels 411-CL-a and 411-CL-b, or the first three levels 411-CL-a and 411-CL-b and 411-CL-c, or four or more iterations, are based on the look-up table 406. In this particular embodiment, every clipping level is a function, at least in part, on its iteration number as first, second, third, fourth, or any subsequence number.

One embodiment is a wireless communication system 400 (FIG. 8A) operative to reduce iteratively a peak-to-average power ratio of wireless transmissions. In one particular form of such embodiment, there is a clipping mechanism 401 (FIG. 8A, 8B, 8C) operative to (i) receive sequences of modulated data 411-a, 411-b, 411-c, (ii) clip each sequence of modulated data using a settable clipping level, and (iii) output clipped sequences of modulated data 412-a, 412-b, 412-c associated with the sequences of modulated data, respectively. Also in this particular form of such embodiment, there is a filter 402 operative to (i) receive the clipped sequences of modulated data 412-a, 412-b, 412-c, (ii) filter out-of-band signals produced by the clipping mechanism 401 out of the clipped sequences of modulated data, and (iii) output clipped-and-filtered sequences of modulated data 413-a, 413-b, 413-c associated with the clipped sequences of modulated data, respectively. Also in this particular form of such embodiment, the wireless communication system 400 is operative to use the clipping mechanism 401 and the filter 402 iteratively, such that at least some of the clipped-and-filtered sequences of modulated data are fed back into the clipping mechanism 401, thereby constituting at least some of the sequences of modulated data as explained hereunder. As one example, first level clipped-and-filtered sequence 413-a is fed back and becomes second level clipped-and-filtered sequence 411-b, and second level clipped-and-filtered sequence 413-b is fed back and becomes third level clipped-and-filtered sequence 411-c. Also in this particular form of such embodiment, the wireless communication system 400 is set up, for each iteration of clipping and filtering, a clipping level that is unique and different than other clipping levels associated with other iterations. For example, (i) clipping level 411-CL-a is set-up for a first iteration associated with 411-a, 412-a, 413-a, (ii) clipping level 411-CL-b is set-up for a second iteration associated with 411-b, 412-b, 413-b, and (iii) clipping level 411-CL-c is set-up for a third iteration associated with 411-c, 412-c, 413-c.

In a first alternative embodiment to the wireless communication system 400 just described, the wireless communication system 400 is further operative to use a last of the clipped-and-filtered sequences of modulated data as a sequence for wireless transmission 413-c-TR (FIG. 9A) by the wireless communication system 400. In FIG. 8C, the last clipped-and-filtered sequence of modulated data is shown as 413-c, which is the sequence after three levels of clipping and filtering, but it is understood that there may be four or more levels of clipping and filtering, or only two levels of clipping and filtering, and the output of the last level will become the sequence for wireless transmission.

In a variation to the first alternative just described, the wireless communication system 400 further includes an interpolation mechanism 403 (FIG. 9B) operative to interpolate the last of said clipped-and-filtered sequences of modulated data 413-c, thereby producing the sequence for wireless transmission 413-c-TR (FIG. 9B) by said wireless communication system 400. Again, the last sequence is shown as 413-c, but it may be a later sequence after four or more levels of clipping and filtering, or a previous sequence after two levels of clipping and filtering.

In a second alternative embodiment to the wireless communication system 400 described above, the wireless communication system 400 is further operative to feed (FIG. 8A) a first of said sequences of modulated data 411-a as an initial input to the clipping mechanism 401, thereby triggering the iterative clipping and filtering operation.

In a first variation to the second alternative just described, the wireless communication system 400 further includes a decimation mechanism 404 (FIG. 10A) operative to produce the first of the sequences of modulated data 411-a as an initial input to the clipping mechanism 401.

In a second variation to the second alternative described above, the wireless communication system 400 further includes a zero-padding mechanism 405 (FIG. 10B) operative to produce the first sequence of modulated data 411-a as an initial input to the clipping mechanism 401.

In a third alternative embodiment to the wireless communication system 400 described above, further the clipping mechanism 401 is a first processor 401P (FIG. 11A) operative to perform the clipping.

In a variation to the third alternative embodiment just described, further the filter 402 is a second processor 402P (FIG. 11A) operative to filter out-of-band signals.

In a first configuration to the variation just described, further the first processor 401P and the second processor 402P are the same one processor 401P. In such configuration, the clipping mechanism and the filter are part of the same processor 401P.

In a second configuration to the variation to the third alternative embodiment described above, further the first processor 401P and the second processor 402P are digital signal processors, 401DSP and 402DSP, respectively (FIG. 11B).

In a fourth alternative embodiment to the wireless communication system 400 described above, further the clipping 401 mechanism is a polar clipping mechanism 401-polar (FIG. 12).

In a fifth alternative embodiment to the wireless communication system 400 described above, further each of the clipping levels, excluding the first clipping level 411-CL-a, is higher and thus more relaxed than previous clipping levels, thereby reducing distortions. For example, 411-CL-c is higher than 411-CL-b, and 411-CL-b is higher than 411-CL-a.

Figure 14:
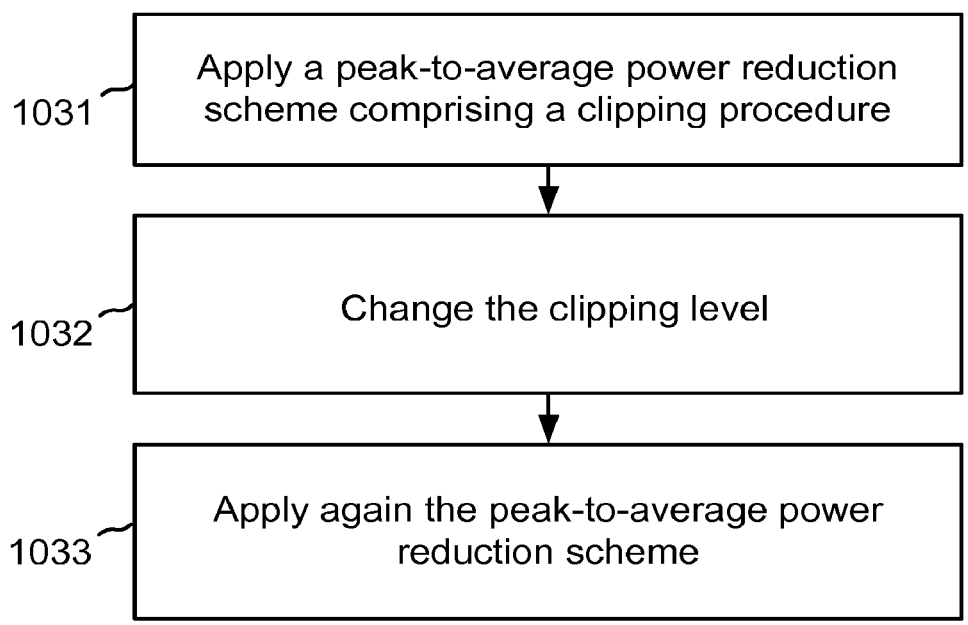
FIG. 14 illustrates one embodiment of a method by which a wireless communication system may reduce the peak-to-average power ratio of a wireless transmission by an iterative clipping scheme.

FIG. 14 illustrates one embodiment of a method by which a wireless communication system may reduce the peak-to-average power ratio of a wireless transmission by an iterative clipping scheme. In step 1031, a wireless communication system 400 applies, on a sequence of modulated data 411-a, a peak-to-average power ratio reduction scheme, where such scheme includes (i) a clipping procedure, executed by a clipping mechanism 401, followed by (ii) out-of-band signal filtering, executed by a filter 402, wherein the clipping procedure is set to a first clipping level 411-CL-a. Application of clipping and filtering at the first clipping level results in a first level clipped-and-filtered sequence of modulated data 413-a. In step 1032, the wireless communication system changes the setting of the clipping mechanism 401 from the first clipping level 411-CL-a to a second clipping level 411-CL-b. In step 1033, the wireless communication system again applies the peak-to-average power ratio reduction scheme, except now the scheme is applied to the first-level clipped and filtered sequence of modulated data 413-a, where sequence 413a is fed back to clipping mechanism 401 as 411-b. After a second level clipping and filtering, the result is an enhanced clipped-and-filtered sequence of modulated data 413-b, which is better optimized for transmission by said wireless communication system. Similarly, a third level clipping and filtering will result in sequence of modulated date 413-c, and subsequent levels of clipping and filtering will result in a higher sequence of modulated data, such as 413-d (not shown) after a fourth level of clipping and filtering, or 413-e (not shown) after a fifth level of clipping and filtering. The wireless communication system 400 is iterative, such that there may be two levels of clipping and filtering, or any number of levels greater than two.

In a first alternative embodiment to the method just described for reducing iteratively the PAPR, further the changing of the clipping and filtering level, and the applying again, is repeated iteratively until reaching a first criterion. Further, each iteration of changing the clipping and filtering level, and applying clipping and filtering again, is associated with a unique clipping level. For example, the first iteration is associated with level 411-CL-a, the second iteration is associated with level 411-CL-b, and the third iteration is associated with level 411-CL-c.

In a first variation to the first alternative method embodiment just described, further the first criterion is a predetermined and fixed number of iterations.

In a second variation to the first alternative method embodiment described above, further the first criterion is crossing below a first threshold of out-of-band signal power.

In a third variation to the first alternative method embodiment described above, further the first clipping level 411-CL-a, the second clipping level 411-CL-b, and each of the other unique clipping levels 411-CL-c and any subsequent level are determined based on a look-up table 406 and as a function of iteration number.

In a fourth variation to the first alternative method embodiment described above, further the second clipping level 411-CL-b is higher than the first clipping level 411-CL-a by a fixed amount of decibels, and each of the unique clipping levels is higher than unique clipping level of previous iteration by this same fixed amount of decibels.

In a second alternative embodiment to the method described above for reducing iteratively the PAPR, further the second clipping level 411-CL-b is predetermined and fixed.

In a third alternative embodiment to the method described above for reducing iteratively the PAPR, further the second clipping level 411-CL-b is higher than said first clipping level 411-CL-a by a predetermined amount of decibels, thereby making the second clipping level more relaxed than said first clipping level, thereby reducing distortions.

In a variation to the third alternative method embodiment just described, further predetermined amount of decibels is between 0.3 decibel and 1 decibel.

In a configuration to the variation to the third alternative method embodiment just described, further said predetermined amount of decibels is approximately 0.5 decibels.

In a fourth alternative embodiment to the method described above for reducing iteratively the PAPR, further the clipping procedure comprises clipping the sequences of modulated data 411-a, 411-b, and 411-c.

In a variation to the fourth alternative method embodiment just described, further the clipping is a polar clipping.

In a fifth alternative embodiment to the method described above for reducing iteratively the PAPR, further decimating, by a decimation mechanism 404, an initial input sequence of modulated data (not shown), thereby producing the sequence of modulated data 411-a which is a decimated version of the initial input sequence of modulated data, and in this way matching a rate of the initial input sequence of modulated data to a desired rate of signal at clipping.

In a first variation to the fifth alternative method embodiment just described, further the decimating is operative to keep a sampling rate over signal bandwidth ratio within a predetermined range.

In a configuration to the variation to the fifth alternative method embodiment just described, further the predetermined range is between approximately 3 and approximately 5.

In a second variation to the fifth alternative method embodiment described above, further interpolating, by interpolator 403, FIG. 9B, the enhanced clipped and filtered sequence of modulated data 413-c, thereby producing 413-c-TR ready for transmission, and as result returning to the rate of initial input sequence (not shown) of modulated data. It is understood that if there are more than three levels of clipping and filtering, then the final sequence of modulated data will not be 413-c, but rather 413-d (not shown) or some higher level sequence of modulated data.

In a sixth alternative embodiment to the method described above for reducing iteratively the PAPR, further zero-padding, by a zero-padding mechanism 405, FIG. 10B, an initial input sequence (not shown) of modulated data, thereby producing the sequence of modulated data 411-*a* which is a zero-padded version of the initial input sequence of modulated data, and a result matching a rate of the initial input sequence of modulated data to a desired rate of clipping.

In variation to the sixth alternative method embodiment just described, further the zero-padding is operative to keep a sampling rate over signal bandwidth ratio within a predetermined range.

In a configuration to the variation to the sixth alternative method embodiment just described, further the predetermined range is between approximately 3 and approximately 5.

In a seventh alternative embodiment to the method described above for reducing iteratively the PAPR, further the wireless transmission system 400 transmitting, as signal 413-*c*-TR, FIG. 9A, FIG. 9B, the enhanced clipped and filtered sequence of modulated data 413-*c*. It is understood that if there are more than three levels of clipping and filtering, then the sequence of modulated data to be transmitted as signal 413-*c*-TR will not be 413-*c*, but rather 413-*d* (not shown) or another signal corresponding to the number of iterations of the clipping and filtering level.

In an eighth alternative embodiment to the method described above for reducing iteratively the PAPR, further the sequence of modulated data 411-*a* conforms to a wireless transmission standard selected from a group consisting of LTE, WiMAX, and WiFi.

In a variation to the eighth alternative method embodiment just described, further the modulation is selected from a group consisting of: BPSK, QPSK, 16-QAM, 64-QAM, and 256-QAM.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A wireless communication system comprising:
   a receiver coupled to a receiver interface, said receiver interface receiving a first signal from a first receiver chain and a second signal from a second receiver chain, said first receiver chain coupled to a first antenna, said second receiver chain coupled to a second antenna, said first antenna and said second antenna receiving a wireless transmission, said receiver interface operative to route said first signal and said second signal to said receiver;
   said receiver interface also operative to utilize said second receiver chain for reception of a third signal not associated with said incoming wireless transmission during a period, said second signal becoming unavailable to said receiver interface during said period; and
   said receiver interface operative, during said period, to substitute to said receiver said second signal with a duplication of said first signal.

2. The system of claim 1, wherein said receiver interface is digital and comprising an analog-to-digital converter operative to convert said first signal into a digital form, and wherein said receiver is digital as well, thereby enabling said duplication to be made at the digital level.

3. The system of claim 1, wherein said substitution to said receiver of said second signal with said duplication of said first signal is done without knowledge of said receiver.

4. The system of claim 2, wherein said receiver and receiver interface are implemented in a digital-signal-processor.

\* \* \* \* \*